(12) United States Patent
Paxton

(10) Patent No.: US 8,551,329 B2
(45) Date of Patent: Oct. 8, 2013

(54) DOSING CHAMBER

(76) Inventor: Andrew Paxton, Taunton (GB)

( * ) Notice: Subject to any disclaimer, the term of this patent is extended or adjusted under 35 U.S.C. 154(b) by 0 days.

(21) Appl. No.: 13/580,155

(22) PCT Filed: Feb. 24, 2011

(86) PCT No.: PCT/IB2011/050793
§ 371 (c)(1),
(2), (4) Date: Aug. 21, 2012

(87) PCT Pub. No.: WO2011/104688
PCT Pub. Date: Sep. 1, 2011

(65) Prior Publication Data
US 2012/0312725 A1    Dec. 13, 2012

(30) Foreign Application Priority Data
Feb. 26, 2010   (GB) .................................. 1003285.2

(51) Int. Cl.
*B01D 35/14*   (2006.01)
*A01K 63/04*   (2006.01)
*E04H 4/16*    (2006.01)

(52) U.S. Cl.
USPC ............ 210/86; 119/259; 210/96.1; 210/143; 210/167.11; 210/167.13; 210/167.19; 210/192; 210/198.1; 210/202; 210/418; 251/142; 251/149.9; 251/251

(58) Field of Classification Search
USPC ............ 210/91, 95, 96, 143, 167.21–167.28, 210/167.3, 192, 198.1, 200–206, 209, 210; 119/258–269; 251/66, 94, 142, 149.9, 213, 251/251
See application file for complete search history.

(56) References Cited

U.S. PATENT DOCUMENTS

| 2,790,461 | A | * | 4/1957 | Lightfoot et al. | 137/635 |
| 2,935,198 | A | * | 5/1960 | Kryzer et al. | 210/138 |
| 2,953,344 | A | * | 9/1960 | Yancey | 251/58 |
| 3,129,172 | A | * | 4/1964 | Dickey, Jr. et al. | 210/167.11 |
| 3,240,338 | A | * | 3/1966 | Borre et al. | 210/141 |
| 3,252,575 | A | * | 5/1966 | Candido Jacuzzi | 210/136 |
| 3,854,450 | A | * | 12/1974 | Puckett | 119/248 |
| 3,911,460 | A | * | 10/1975 | Lasky et al. | 396/571 |
| 4,995,980 | A | * | 2/1991 | Jaubert | 210/602 |
| 5,054,424 | A | * | 10/1991 | Sy | 119/260 |
| 5,728,293 | A | * | 3/1998 | Guoli et al. | 210/151 |
| 5,893,969 | A | * | 4/1999 | Goldman | 210/95 |
| 6,607,661 | B2 | * | 8/2003 | Koivula | 210/120 |
| 6,641,732 | B1 | * | 11/2003 | Cheyne | 210/615 |
| 6,712,961 | B2 | * | 3/2004 | Chauquet | 210/167.21 |
| 7,294,257 | B2 | * | 11/2007 | Jackson | 210/167.21 |
| 7,329,345 | B2 | * | 2/2008 | King et al. | 210/198.1 |

(Continued)

FOREIGN PATENT DOCUMENTS

WO      2006/034275     3/2006

*Primary Examiner* — Joseph Drodge
(74) *Attorney, Agent, or Firm* — Crose Law LLC; Bradley D. Crose

(57) ABSTRACT

Dosing chambers, for use with pressurized water filters of the type used with ponds, require isolation before accessing to prevent water egress. The invention comprises a chamber in which dosing substances may be placed, a water inlet and a water outlet, a lid for sealingly closing the chamber, a valve for closing the water inlet and an interlock means for operating the valve to close the water inlet as the lid is removed, so that when dosing substances are placed into the chamber pressurized water is prevented from issuing through the inlet.

10 Claims, 4 Drawing Sheets

(56) References Cited

U.S. PATENT DOCUMENTS

| | | |
|---|---|---|
| 2004/0182767 A1 | 9/2004 | Patron |
| 2006/0096900 A1* | 5/2006 | Marioni .................. 210/106 |
| 2006/0138034 A1* | 6/2006 | Weng ........................... 210/169 |
| 2007/0193956 A1* | 8/2007 | Nelson .......................... 210/703 |

* cited by examiner

DOSING CHAMBER

FIELD OF THE INVENTION

The present invention relates to a dosing chamber for use with water filters of the type used to filter pond water.

BACKGROUND OF THE INVENTION

The water in ponds and aquaria tends to become dirty over time due to an accumulation of algae and other debris. Accordingly, water filters are known which include a chamber including filter media. The filter media may comprise open cell foam, sand, beads or other elements some, or all, of which may be substantially inert relative to the water. The water is passed through the filter chamber, and hence the filter media, such that the debris is substantially removed from it.

As an alternative, or in addition, to the use of filters other methods of treating the water are known such as UV lamps and the addition of biological and/or chemical substances, or agents. One way to introduce these substances into the water is by the use of a dosing chamber which is in fluid connection with the water filter, and/or pump. Such doing chambers typically comprise a container into which the dosing substances may be placed. A water inlet and a water outlet are also provided. Accordingly, in use, water enters the container and is dosed before exiting the container. Dosing substances may be in the form of liquids, tablets, granules and gels, however this list is not exhaustive.

In systems where the water is pressurised, either because it is pumped or because the dosing chamber is at a lower level than the source of water (such as a pond), it is necessary to isolate the chamber before opening it to place dosing substances therein. Typically this is achieved by a valve provided in the conduit supplying the water to the water inlet. A valve in the conduit taking the water away from the water outlet may also typically be provided with a valve, especially if the outlet is connected to a source of water (such as a waterfall header tank) which is higher than the dosing chamber.

In domestic ponds, the user must isolate the chamber prior to opening it. If this is not done then when the lid is removed, or the chamber opened in some other way, water may gush from the chamber under pressure possibly causing injury.

Accordingly, it is desirable to have a dosing chamber wherein the act of removing the lid isolates at least the water inlet such that when the lid is removed no pressurised water escapes from the chamber.

BRIEF SUMMARY OF THE INVENTION

In a first aspect, there is provided a dosing chamber for use with a pressurised water filter of the type used with ponds comprising a chamber in which dosing substances may be placed, a water inlet and a water outlet, a lid for sealingly closing the chamber, one or more valves for closing the water inlet and/or outlet and an interlock means for operating the one or more valves to close the water inlet and/or outlet as the lid is removed, so that when dosing substances are placed into the chamber pressurised water is prevented from issuing through the inlet and/or outlet. In at least one embodiment, the interlock means may be an interlock controller.

In this regard the water may be pressurised by any means such as a pump, relative height, and the siphoning effect.

The one or more valves may be located inside and/or outside the chamber.

The interlock means may operate the one or more valves to close the water inlet and/or outlet simultaneously with the lid being removed. In this regard, the act of removing the lid, whether that is by unscrewing the lid, the undoing of catches, or the like, may operate the interlock means.

The interlock means may operate the one or more valves to close the water inlet and/or outlet immediately prior to the lid being removed. Again, this may be caused by the act of removing the lid, whether that is by unscrewing the lid, the undoing of catches, or the like.

The one or more valves may comprise a shutter for blocking the water inlet and/or outlet. However, other means of sealing the inlet and/or outlet are contemplated.

One of the lid and the shutter may include a cam and the other of the lid and shutter may include a cam follower, the lid being rotatable such that the cam and cam follower may interact to permit a biasing means to move the shutter and close the inlet and/or outlet before, or as, the lid is removed from the chamber. In at least one embodiment, the biasing means may be a biasing mechanism.

The arrangement of the interlock means may provide for the interaction of the cam and cam follower to permit the biasing means to move the shutter to open the inlet and/or outlet only after the lid sealingly closes the chamber.

The interlock means may be arranged to open the water inlet and/or outlet when the lid is attached to the chamber.

The dosing chamber may include a pump and/or a UV lamp and/or a water filter.

The dosing chamber may include a sensor, for detecting a reduction in quantity of dosing substances present in the chamber below a threshold value, and an indicator for providing a signal that the quantity of dosing substances has fallen below the threshold value.

The dosing chamber may comprise a substantially transparent lid for enabling visual inspection of the interior. A source of illumination may be provided for illuminating the interior.

In a second aspect, the invention provides a water filter of the type used with ponds comprising a filter chamber, an inlet to, and outlet from, the chamber, and a dosing chamber, according to the first aspect and as described and/or claimed herein, in fluid connection with the chamber.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION OF THE INVENTION

Figure 1:
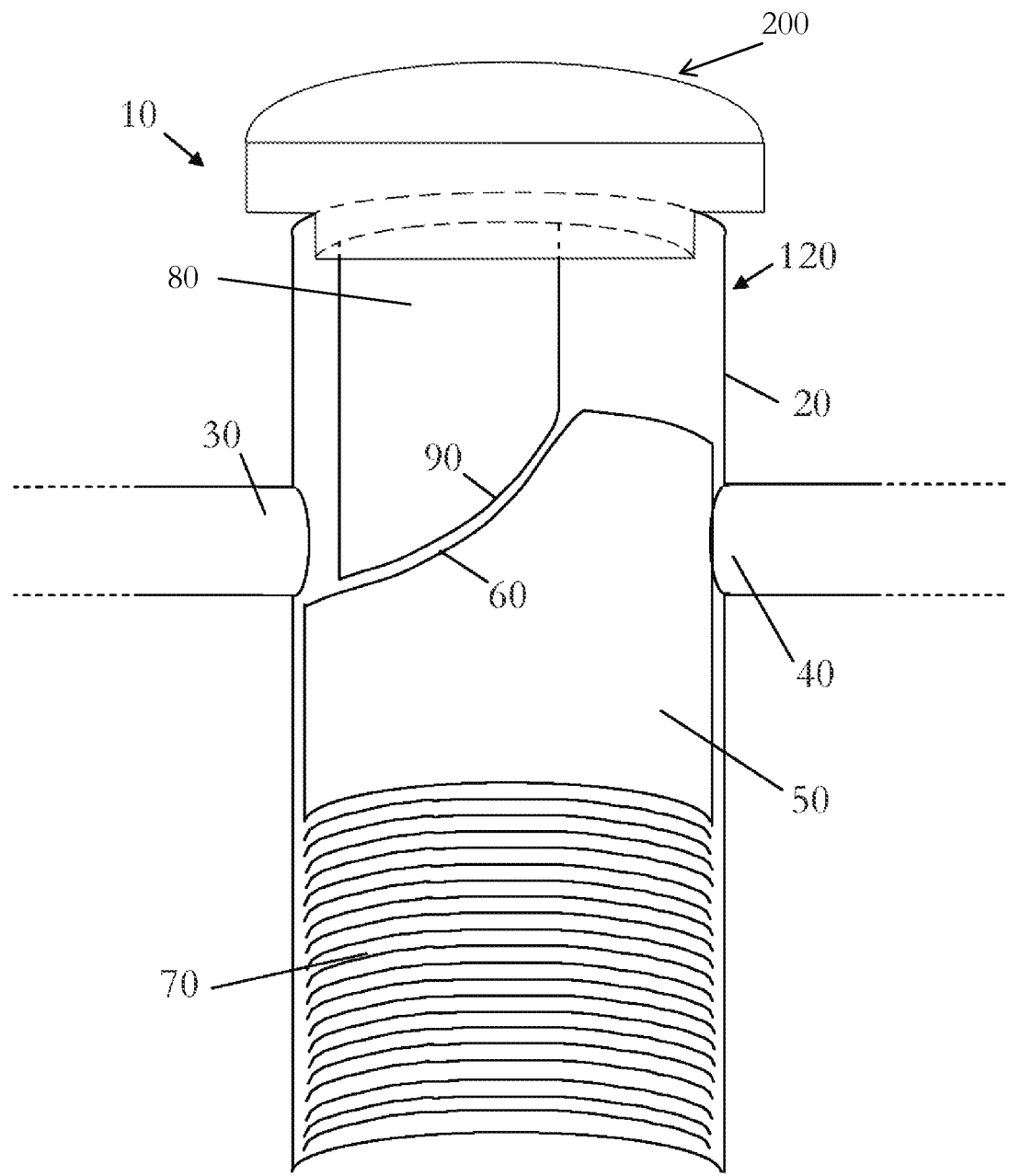
FIGS. 1 to 3 are elevational views of one half of a dosing chamber with a shutter in a series of positions between fully open and fully closed.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may refer to different embodiments. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

Figure 2:
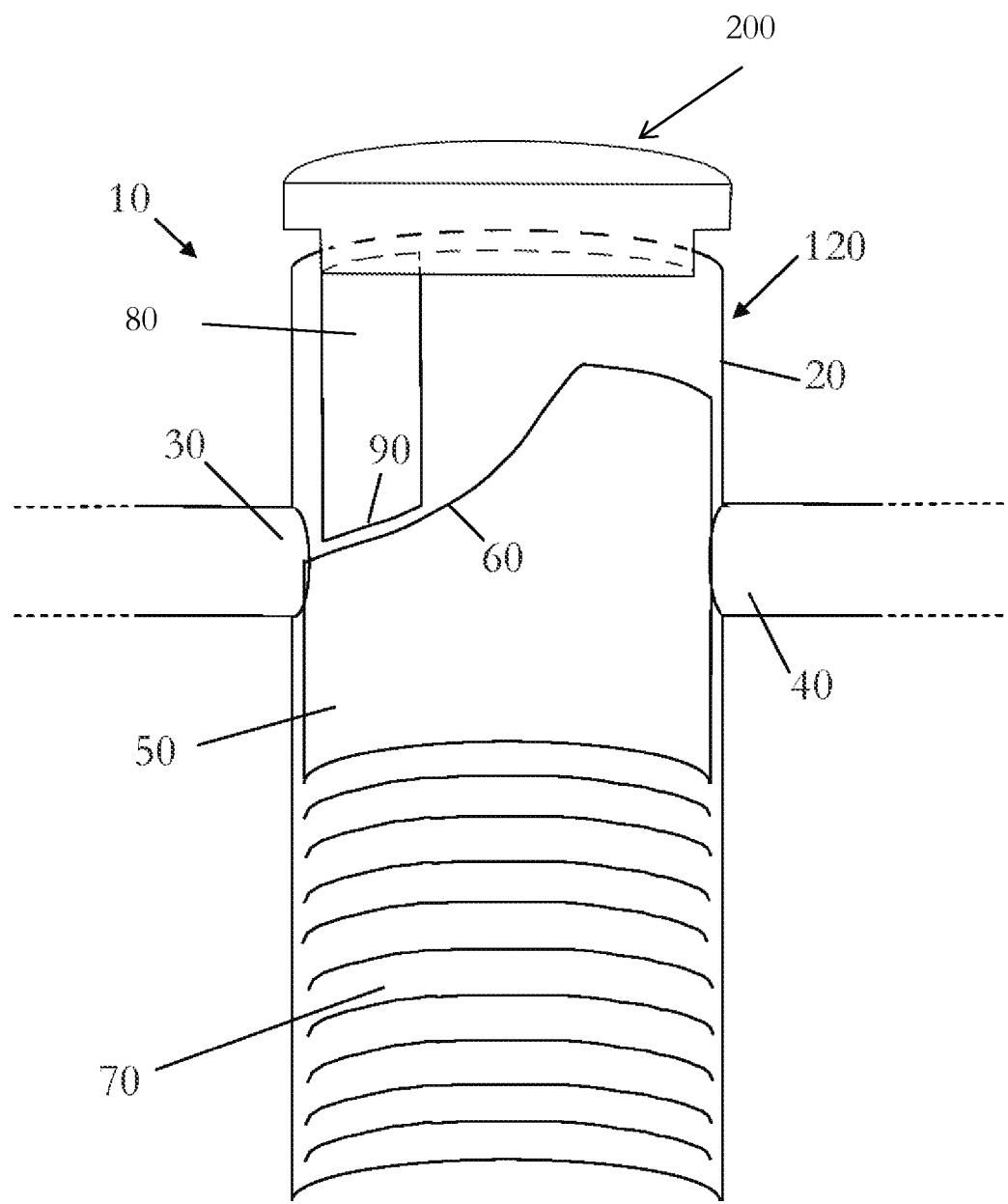
Figure 3:
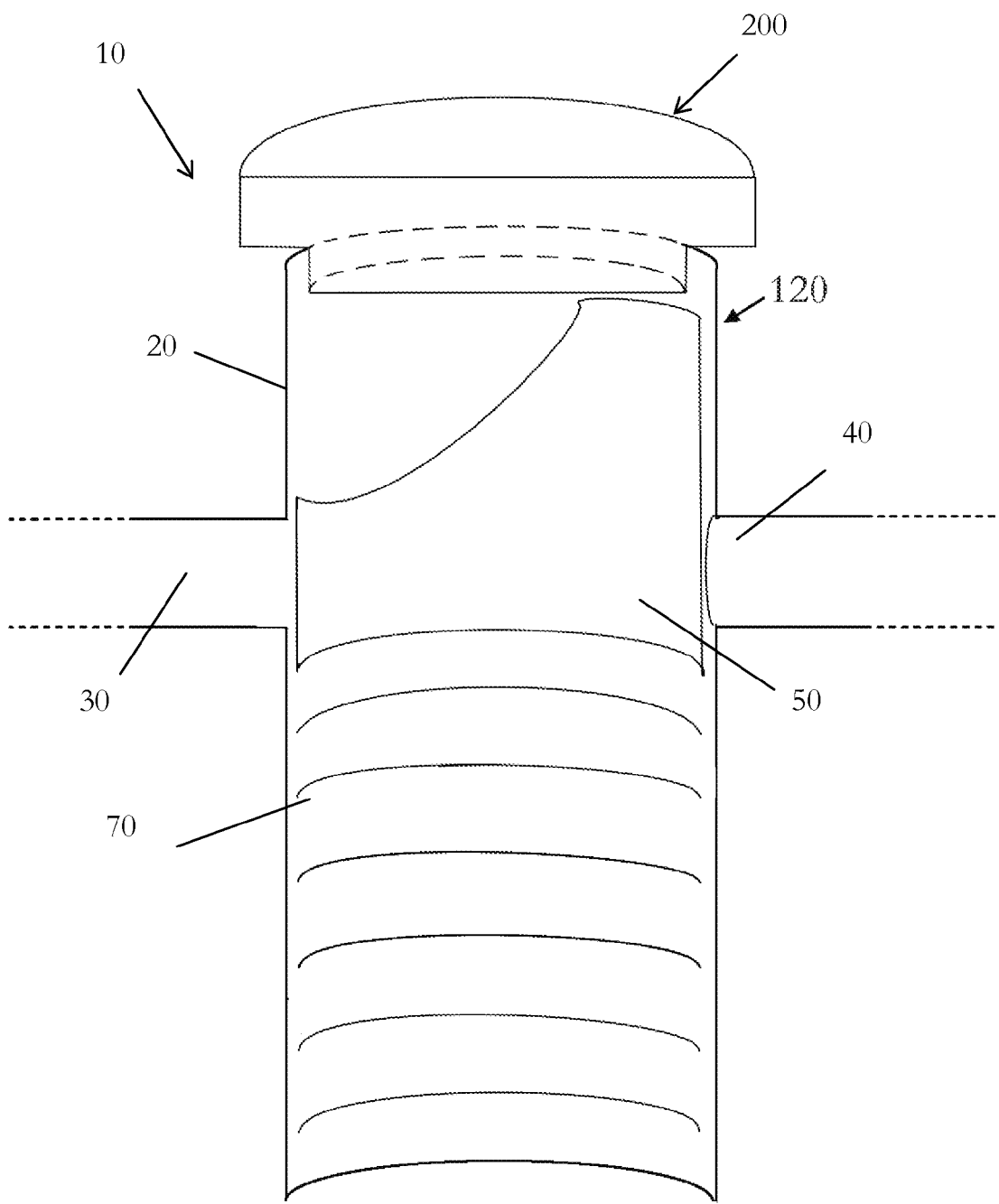
Figure 4:
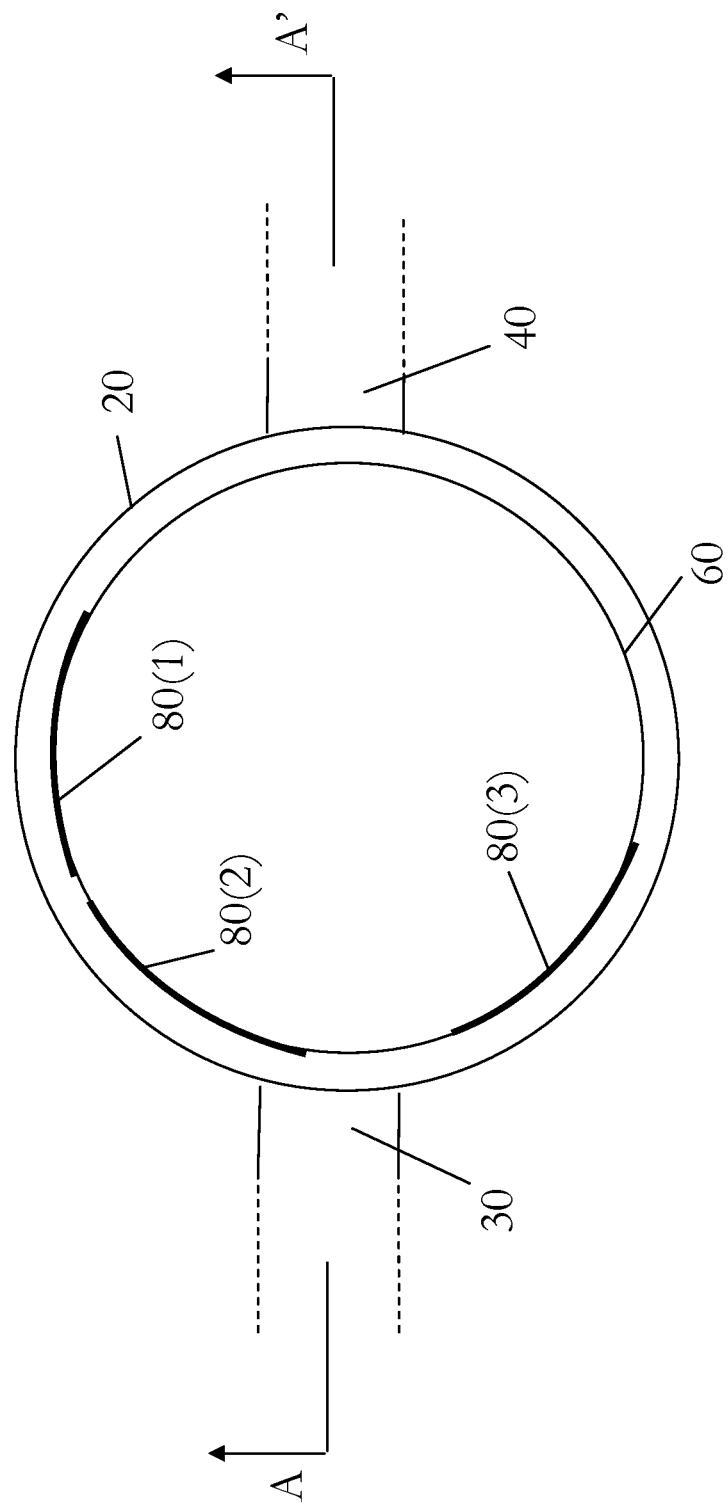
FIG. 4 is a plan view of the dosing chamber of FIGS. 1 to 3 showing the various positions of a cam in FIGS. 1 to 3.

With reference to FIGS. 1 to 3, partial views of a dosing chamber 10 are shown. These are sectional views looking in the direction of the arrows marked A, A' in FIG. 4. FIG. 4 is a plan view looking down on the chamber 10. In FIGS. 1 to 3, the rear half (the upper half shown in FIG. 4) of the chamber body 20 is visible.

The chamber body 20 is substantially cylindrical in shape having a water inlet 30 and a water outlet 40 in the form of spigots or conduits arranged on either side of, and being in fluid connection with, the chamber body 20. The chamber body 20 includes a base (not shown).

Within the chamber body 20 a shutter 50 is provided. This is a cylinder fitting inside the chamber body 20. It has a planar base which is acted upon by a biasing coil spring 70. This spring urges the shutter upwardly.

At the end opposite to the base, the shutter 50 includes a cam follower in the form of a surface 60 included to the planar base. This cam follower 60 occupies only a portion of the circumference of the shutter 50.

The dosing chamber 10 also includes a lid 200. The lid 200 may screw onto the chamber 10 by means of corresponding screw threads, arranged at the upper portion of the chamber body 20 in the vicinity of the area referenced "120" and the lid 200, such that the lid 200 may be attached to, or removed from the chamber body 20 by relative rotation of the two.

The lid 200 includes a cam 80 depending from its underside and which fits inside the chamber body 20. The cam 80 is in the form of a portion of a cylinder having an arc of approximately 40 degrees, although other segmental arc dimension are contemplated.

This cam 80 includes a cam surface 90 which is an inclined surface having approximately the same angle of inclination as the cam follower surface 60.

With the lid 200 attached to the chamber body 20 such that the chamber is sealed (apart from the inlet 30 and outlet 40), the cam surface 90 acts to push the shutter 50 downwardly against the biasing force provided by the spring 70. Accordingly, the inlet 30 and outlet 40 are in the open position such that fluid may flow into and out of the chamber body 20.

The relative position of the cam 80(1) and chamber body 20 is shown in FIG. 4.

In FIG. 2, the lid 200 has been partially rotated relative to the chamber body 20 such that the cam 80 has rotated relative to the shutter 50. This is shown in FIG. 4 where the position of the cam 80 is referenced "80(2)". Due to the corresponding cam surfaces 60, 90 having rotated relative to one another the cam 80 has allowed the shutter 50 to lift upwardly relative to the base of the chamber body 20 due to the force provided by the spring 70.

Although the outlet 40 is shown closed it is seen that the inlet 30 is still partially open.

Continued rotation of the lid 200 relative to the chamber body 20 moves the cam 80 further circumferentially around the inside of the chamber body 20 such that the cam 80 is now no longer in axial alignment with the cam follower surface 60.

Accordingly, the shutter 50 has moved upwardly relative to the base of the chamber body 20 due to the force provided by the spring 70.

In this position the inlet 30 is now also fully closed as the shutter blocks its opening in the side wall of the chamber body 20.

The relative position of the cam 80 relative to the chamber is shown in FIG. 4 where the cam 80 is referenced "80(3)". However, the position of the cam 80 is not visible in FIG. 3, as it is located in the front half (the lower half shown in FIG. 4) of the chamber body 20, which has been cut away from FIGS. 1-3 for the purpose of clarity.

The lid may now be removed from the dosing chamber 10 such that dosing substances may be added to the chamber body 20.

The dosing chamber 10 may include means for preventing the lid from being removed until the shutter 50 completely sealingly closes both the inlet 30 and outlet 40. For instance, the screw threads may be arranged such that the lid may only be removed after further rotation of the lid relative to the chamber body 20. This further rotation may be only slight such that it does not cause the shutter 50 to be depressed into the chamber body 20.

Although screw threads have been described for attaching the lid to the chamber body 20 other means such as lugs and slots may be provided.

The rotation of the lid from complete sealing attachment to the dosing chamber 10 to complete removal therefrom may be less then 360 degrees and may be approximately 180 degrees.

To close the chamber 10 and re-open the inlet 30 and outlet 40 the lid is screwed back onto the chamber body 20. Locator means may be provided for allowing the lid to be attached to the chamber body 20 in only one relative angular position to ensure that the shutter 50 is operated correctly.

By screwing the lid onto the chamber body 20 the cam 80 acts against the force provided by the spring 70 to push down the shutter 50 as the cam surfaces 90, 60 slide against one another.

The dosing chamber 10 may include means for preventing the rotation of the lid relative to the chamber body 20 beyond a predetermined threshold angle, such as 180 degrees or 270 degrees. These means may be corresponding lugs on the lid and chamber body 20.

Although the construction of the dosing chamber 10 has been described in this manner, it is to be understood that other ways in which the act of removing and replacing a lid may close and open the inlet/outlet are contemplated.

What is claimed is:

1. A dosing chamber suitable for fluid connection with a pressurised pond or aquaria water filter, the dosing chamber comprising a chamber for receiving dosing substances therein, a water inlet and a water outlet, a lid, separated from the inlet and outlet, for sealingly closing the chamber, one or more valves for closing the water inlet and/or outlet and an interlock controller arrangement within the chamber for operating the one or more valves to close the water inlet and/or outlet simultaneously with the lid being removed, so that when dosing substances are placed into the chamber, pressurised water is prevented from issuing through the inlet and/or outlet.

2. The dosing chamber of claim 1, wherein the arrangement comprises one or more of the valves comprising a shutter for blocking the water inlet and/or outlet.

3. The dosing chamber of claim 2, wherein the arrangement further comprises one of the lid and the shutter including a cam and the other of the lid and shutter including a cam follower, and the lid is rotatable such that the cam and cam follower interact to permit a biasing mechanism to move the shutter and close the inlet and/or outlet before, or as, the lid is removed from the chamber.

4. The dosing chamber of claim 3, wherein the arrangement of the interlock controller provides for the interaction of the cam and cam follower to permit the biasing mechanism to move the shutter to open the inlet and/or outlet only after the lid sealingly closes the chamber.

5. The dosing chamber of claim 1, wherein the interlock controller arrangement is arranged to open the water inlet and/or outlet when the lid is attached to the chamber.

6. The dosing chamber of claim 1, including a pump and/or a UV lamp and/or a water filter.

7. The dosing chamber of claim 1, including a sensor, for detecting a reduction in quantity of dosing substances present in the chamber below a threshold value, and an indicator for providing a signal that the quantity of dosing substances has fallen below the threshold value.

8. The dosing chamber of claim 1, wherein the lid is a substantially transparent lid for enabling visual inspection of its interior.

9. The dosing chamber of claim 1, including a source of illumination for illuminating its interior.

10. A pond or aquaria water filter comprising a filter chamber, an inlet to, and outlet from, the filter chamber, and a dosing chamber, according to claim 1, in fluid connection with the chamber.

* * * * *